(12) United States Patent
Shindo

(10) Patent No.: US 11,104,781 B2
(45) Date of Patent: *Aug. 31, 2021

(54) RUBBER COMPOSITION FOR GOLF BALL, AND GOLF BALL

(71) Applicant: Bridgestone Sports Co., Ltd., Tokyo (JP)

(72) Inventor: Jun Shindo, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 16/406,099

(22) Filed: May 8, 2019

(65) Prior Publication Data

US 2019/0375917 A1 Dec. 12, 2019

(30) Foreign Application Priority Data

Jun. 11, 2018 (JP) .............................. JP2018-111044

(51) Int. Cl.

| | |
|---|---|
| *C08K 5/053* | (2006.01) |
| *C08K 5/05* | (2006.01) |
| *C08L 9/00* | (2006.01) |
| *A63B 37/02* | (2006.01) |
| *C08K 5/098* | (2006.01) |
| *C08K 5/375* | (2006.01) |
| *A63B 37/00* | (2006.01) |
| *C08K 5/14* | (2006.01) |

(52) U.S. Cl.
CPC ............ *C08L 9/00* (2013.01); *A63B 37/0051* (2013.01); *A63B 37/0063* (2013.01); *C08K 5/05* (2013.01); *C08K 5/053* (2013.01); *C08K 5/098* (2013.01); *C08K 5/14* (2013.01); *C08K 5/375* (2013.01); *A63B 37/0064* (2013.01); *A63B 37/0074* (2013.01); *A63B 37/0096* (2013.01)

(58) Field of Classification Search
None
See application file for complete search history.

(56) References Cited

U.S. PATENT DOCUMENTS

| | | | |
|---|---|---|---|
| 10,653,922 B2* | 5/2020 | Watanabe | A63B 37/0087 |
| 10,695,618 B2* | 6/2020 | Kimura | A63B 37/0076 |
| 10,773,130 B2* | 9/2020 | Watanabe | A63B 37/0068 |
| 2002/0137849 A1* | 9/2002 | Kerns | C08F 36/04 |
| | | | 525/201 |
| 2003/0208000 A1* | 11/2003 | Higuchi | C08L 51/04 |
| | | | 525/274 |
| 2006/0128900 A1* | 6/2006 | Nanba | C08L 9/00 |
| | | | 525/261 |
| 2017/0368418 A1* | 12/2017 | Nakajima | A63B 37/0051 |
| 2020/0001143 A1* | 1/2020 | Shindo | A63B 37/0077 |

FOREIGN PATENT DOCUMENTS

JP 11-169485 A 6/1999

\* cited by examiner

*Primary Examiner* — David J Buttner
(74) *Attorney, Agent, or Firm* — Sughrue Mion, PLLC

(57) ABSTRACT

A rubber composition for golf balls includes (a) a base rubber, (b) a co-crosslinking agent which is an $\alpha,\beta$-unsaturated carboxylic acid and/or a metal salt thereof, (c) a crosslinking initiator, and (d) a lower alcohol having a molecular weight of less than 200. When the rubber composition is used in a golf ball having a core and a cover of one or more layers encasing the core, by setting the hardness difference in the core interior hardness profile to a large value while maintaining a desired core hardness, low spin properties can be manifested on golf ball shots, enabling the flight performance of the ball to be improved.

12 Claims, No Drawings

RUBBER COMPOSITION FOR GOLF BALL, AND GOLF BALL

CROSS-REFERENCE TO RELATED APPLICATION

This non-provisional application claims priority under 35 U.S.C. § 119(a) on Patent Application No. 2018-111044 filed in Japan on Jun. 11, 2018, the entire contents of which are hereby incorporated by reference.

TECHNICAL FIELD

The present invention relates to a rubber composition for golf balls, and to a golf ball in which the composition is used. More particularly, the invention relates to a rubber composition for golf balls which can be suitably used as the core material in golf balls having a core of one or more layer and a cover of one or more layer, and to a golf ball in which such a composition is used.

BACKGROUND ART

Golf balls lately are predominantly either two-piece solid golf balls or three-piece solid golf balls. These golf balls generally have a structure in which a cover of one layer or a plurality of layers made of various resin materials encases a core made of a rubber composition. The core accounts for most of the golf ball volume and exerts a large influence on ball properties such as rebound, feel and durability. Recently, a number of disclosures have been made in which the cross-sectional hardness of the core is suitably adjusted so as to achieve a specific core hardness gradient, thereby optimizing the spin properties of the ball on full shots with a driver or an iron and enabling the ball to travel an increased distance. Enlarging the hardness difference between the core surface and center is known have the effect of reducing the spin rate on full shots with a driver. Moreover, it is known from prior findings that reducing the spin rate on full shots leads to an increased distance. Accordingly, in order to improve the distance traveled by a golf ball, there is a desire for art that enlarges the hardness difference at the core interior. One approach that has been proposed for achieving this aim is to give the core a structure made of two rubber layers. However, producing such a core would entail a relatively large number of operations compared with a single-layer rubber core, and so there remains a desire for art that enlarges the hardness difference within a single-layer core.

Methods for adjusting the cross-sectional hardness of the core include, for example, suitably adjusting the compounding ingredients in the core rubber composition and the vulcanization temperature and time. Alternatively, with regard to the compounding ingredients in the core rubber composition, another method is to select the types of co-crosslinking agent and organic peroxide used and to adjust their contents. In terms of co-crosslinking agents, the use of methacrylic acid, acrylic acid and metal salts thereof is known in the field of golf balls. However, adjustment in the compounding of such co-crosslinking agents is intended primarily to modulate the feel of the ball on impact by regulating the core hardness, and is not capable of satisfying the desired spin properties.

JP-A H11-169485 discloses art in which a specific amount of polyethylene glycol is included in a core-forming rubber composition. However, the object of this prior art is to improve the mold releasability of a rubber molding (core) by including polyethylene glycol as an internal mold release agent. It is not aimed at further improving the internal hardness of a rubber molding and the spin-lowering effect on a golf ball by judicious selection of the types of compounding ingredients used in a core-forming rubber composition.

SUMMARY OF THE INVENTION

It is therefore an object of the present invention to provide a rubber composition for golf balls which, by setting the hardness difference in the hardness profile of a golf ball core to a large value while maintaining a desired core hardness, is able to manifest low spin properties on golf ball shots and thus improve the flight performance of the ball. A further object of the invention is to provide a golf ball made using this rubber composition.

As a result of extensive investigations, we have discovered that, by having a rubber composition for a golf ball core include as the essential compounding ingredients (a) a base rubber, (b) a co-crosslinking agent that is an $\alpha,\beta$-unsaturated carboxylic acid and/or a metal salt thereof, (c) a crosslinking initiator and (d) a lower alcohol having a molecular weight of less than 200, the hardness difference in the hardness profile at the interior of the core can be set to a large value while maintaining a desired core hardness, enabling low spin properties to be fully manifested on golf ball shots. The reason for this, although not entirely clear, is thought to be as follows.

By including the above specific lower alcohol in the core material, decomposition of the organic peroxide within the core formulation is promoted, enabling the distinctive cross-linked structure of butadiene rubber to be obtained. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where a lower alcohol is added to the core, it is thought that the hydroxyl groups on the lower alcohol promote decomposition of the organic peroxide, making it possible to vary radical reactions like those described above at the core center and the core surface. That is, decomposition of the organic peroxide is further promoted near the center of the core, bringing about greater radical deactivation, which leads to a further decrease in the amount of active radicals. This is thought to be the mechanism by which a core wherein the crosslink densities at the core center and the core surface differ markedly can be obtained.

Accordingly, in a first aspect, the invention provides a rubber composition for golf balls that includes (a) a base rubber, (b) a co-crosslinking agent which is an $\alpha,\beta$-unsaturated carboxylic acid and/or a metal salt thereof, (c) a crosslinking initiator, and (d) a lower alcohol having a molecular weight of less than 200.

The amount of component (d) is preferably from 0.5 to 5 parts by weight per 100 parts by weight of the base rubber (a).

Component (d) is preferably a monohydric, dihydric or trihydric alcohol, and more preferably butanol, glycerol, ethylene glycol or propylene glycol.

The rubber composition preferably includes also (e) an organosulfur compound.

In a preferred embodiment, the rubber composition of the invention, in a vulcanized form thereof, is adapted for use as a golf ball core.

The vulcanized rubber composition preferably has a surface and a center with a hardness difference therebetween of at least 20 on the JIS-C hardness scale.

In a second aspect, the invention provides a golf ball having a core and a cover of one or more layers encasing the core, wherein the core is formed of the rubber composition according to the first aspect of the invention.

The core preferably has a hardness profile in which a surface and a center of the core have a hardness difference therebetween of at least 20 on the JIS-C hardness scale.

Advantageous Effects of the Invention

The rubber composition for golf balls according to the invention, when used in various structural elements of a golf ball, especially the core, is able to manifest low spin properties in the golf ball when the ball is hit and can therefore improve the flight performance of the ball.

DESCRIPTION OF THE PREFERRED EMBODIMENTS

The objects, features and advantages of the invention will become more apparent from the following detailed description.

The rubber composition for golf balls of the invention is characterized by including the following components:
(a) a base rubber,
(b) a co-crosslinking agent which is an α,β-unsaturated carboxylic acid and/or a metal salt thereof,
(c) a crosslinking initiator, and
(d) a lower alcohol having a molecular weight of less than 200.

The base rubber serving as component (a) is not particularly limited, although it is especially suitable to use polybutadiene.

It is desirable for the polybutadiene to have, in the polymer chain thereof, a cis-1,4 bond content of at least 60%, preferably at least 80%, more preferably at least 90%, and most preferably at least 95%. When cis-1,4 bonds account for too few of the bonds on the polybutadiene molecule, the resilience may decrease.

The content of 1,2-vinyl bonds on the polybutadiene is generally 2% or less, preferably 1.7% or less, and more preferably 1.5% or less, of the polymer chain. When the content of 1,2-vinyl bonds is too high, the resilience may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80.

The term "Mooney viscosity" used herein refers to an industrial indicator of viscosity (JIS K 6300) measured with a Mooney viscometer, which is a type of rotary plastometer. This value is represented by the unit symbol $ML_{1-4}$ (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The polybutadiene accounts for a proportion of the overall rubber that is preferably at least 60 wt %, more preferably at least 70 wt?/o, and most preferably at least 90 wt %. The above polybutadiene may account for 100 wt % of the base rubber; that is, it may account for all of the base rubber.

Next, component (b) is a co-crosslinking agent, this being an α,β-unsaturated carboxylic acid and/or a metal salt thereof. The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

The content of component (b) per 100 parts by weight of the base rubber serving as component (a) is preferably at least 10 parts by weight, more preferably at least 15 parts by weight, and even more preferably at least 20 parts by weight. The upper limit is preferably not more than 65 parts by weight, more preferably not more than 60 parts by weight, and even more preferably not more than 55 parts by weight. At a content lower than this range, the ball may be too soft and have a poor rebound. At a content higher than this range, the ball may be too hard, resulting in a poor feel on impact, and may also be brittle and thus have a poor durability.

The co-crosslinking agent serving as component (b) has a mean particle size of preferably from 3 to 30 μm, more preferably from 5 to 25 μm, and even more preferably from 8 to 15 μm. At a mean particle size for the co-crosslinking agent that is below 3 μm, the co-crosslinking agent tends to agglomerate within the rubber composition, leading to a rise in reactivity between molecules of acrylic acid and a decline in reactivity between molecules of the base rubber, as a result of which the golf ball may be unable to achieve a sufficient rebound performance. At a mean particle size for the co-crosslinking agent in excess of 30 μm, the co-crosslinking agent particles become too large, increasing the variability in the properties of the resulting golf balls.

Component (c) is a crosslinking initiator. It is preferable to use an organic peroxide as this crosslinking initiator, and especially preferable to use an organic peroxide having a one minute half-life temperature of between 110 and 185° C. Examples of such organic peroxides include dicumyl peroxide (Percumyl D, from NOF Corporation), 2,5-dimethyl-2,5-di(t-butylperoxy)hexane (Perhexa 25B, from NOF Corporation) and di-(2-t-butylperoxyisopropyl)benzene (Perbutyl P, from NOF Corporation). The use of dicumyl peroxide is preferred. Other commercial products include Perhexa C-40, Niper BW and Peroyl L (all from NOF Corporation), and Luperco 231XL (from AtoChem Co.). These may be used singly, or two or more may be used together.

The content of component (c) per 100 parts by weight of the base rubber is preferably at least 0.1 part by weight, and more preferably at least 0.3 parts by weight. The upper limit is preferably not more than 5 parts by weight, more preferably not more than 4 parts by weight, and even more preferably not more than 3 parts by weight.

Next, component (d) is a lower alcohol having a molecular weight of less than 200. As used herein, an "alcohol" refers to a substance having at least one alcoholic hydroxyl group; substances obtained by polycondensing polyhydric alcohols having two or more hydroxyl groups are also included herein as alcohols. A "lower alcohol" refers to an alcohol which has a small number of carbon atoms, and thus a low molecular weight. By including this lower alcohol in the rubber composition, a cured rubber material (core) having the desired core hardness profile can be obtained during vulcanization (curing) of the rubber composition, as a result of which the ball fully achieves a lower spin rate when hit, enabling the ball to be endowed with an excellent flight performance.

It is especially suitable for the lower alcohol to be a monovalent, divalent or trivalent alcohol (alcohols having one, two or three alcoholic hydroxyl groups). Specific examples include, but are not limited to, methanol, ethanol, propanol, butanol, ethylene glycol, diethylene glycol, propylene glycol, dipropylene glycol, tripropylene glycol and glycerol. These have a molecular weight that is less than 200, preferably less than 150, and more preferably less than 100. When the molecular weight is too large, i.e., when the lower alcohol has too many carbons, the desired core hardness profile is not obtained and a reduced spin rate cannot be fully achieved when the ball is hit.

The content of component (d) per 100 parts by weight of the base rubber is preferably at least 0.1 part by weight, and more preferably at least 0.5 part by weight. The upper limit is preferably not more than 10 parts by weight, more preferably not more than 6 parts by weight, and even more preferably not more than 3 parts by weight. At a component (d) content that is too high, the hardness decreases and the desired feel at impact, durability and rebound may not be obtained. At a content that is too low, the desired core hardness profile may not be obtained and a reduced spin rate may not be fully achieved when the ball is hit.

Aside from above components (a) to (d), various additives such as fillers, antioxidants and organosulfur compounds may be included, provided that doing so is not detrimental to the objects of the invention.

Examples of fillers that may be suitably used include zinc oxide, barium sulfate and calcium carbonate. These may be used singly, or two or more may be used together. The filler content per 100 parts by weight of the base rubber may be set to preferably at least 1 part by weight, more preferably at least 3 parts by weight, and even more preferably at least 5 parts by weight. The upper limit in the filler content per 100 parts by weight of the base rubber may be set to preferably not more than 100 parts by weight, more preferably not more than 60 parts by weight, and even more preferably not more than 40 parts by weight. At a filler content that is too high or too low, it may not be possible to obtain a proper weight and a suitable rebound.

Examples of antioxidants include, without particular limitation, phenolic antioxidants such as 2,2-methylenebis(4-methyl-6-tert-butylphenol), 4,4-butylidenebis(3-methyl-6-tert-butylphenol) and 2,2-methylenebis(4-ethyl-6-tert-butylphenol). Commercial products that may be used include Nocrac NS-6, Nocrac NS-30 and Nocrac NS-5 (from Ouchi Shinko Chemical Industry Co., Ltd.). These may be used singly, or two or more may be used together. The content of antioxidant per 100 parts by weight of the base rubber, although not particularly limited, is preferably at least 0.05 part, and more preferably at least 0.1 part. The upper limit is preferably not more than 1.0 part by weight, more preferably not more than 0.7 part by weight, and even more preferably not more than 0.4 part by eight. When the content is too high or too low, an appropriate core hardness gradient may not be obtained, as a result of which it may not be possible to obtain a suitable rebound, suitable durability and suitable spin rate lowering effect on full shots.

The organosulfur compound is not particularly limited. Examples include thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothi ophenol, and any of the following having 2 to 4 sulfur atoms: diphenylpolysulfides, dibenzylpolysulfides, dibenzoylpolysulfides, dibenzothi azoylpolysulfides and dithiobenzoylpolysulfides. These may be used singly, or two or more may be used together. Of these, preferred use can be made of the zinc salt of pentachlorothiophenol and/or diphenyldisulfide.

It is recommended that the amount of organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a hot-molded rubber composition that has too low a hardness. On the other hand, including too little may make a rebound-improving effect unlikely.

The core can be produced by vulcanizing/curing the rubber composition containing the above ingredients. For example, production can be carried out by using a mixing apparatus such as a Banbury mixer or a roll mill to knead the rubber composition, then using a core mold to compression mold or injection mold the kneaded composition and suitably heating the molded body at a temperature suitable for the organic peroxide and co-crosslinking agent to act, such as at between about 100° C. and about 200° C. for a period of 10 to 40 minutes, so as to cure the molded body.

Here, by compounding the ingredients as described above, the vulcanized/cured rubber molding for golf balls can be conferred with a hardness profile in which the difference in hardness between the surface and the center thereof is large. By employing this rubber molding for golf balls as a golf ball core, the durability of the golf ball can be increased while maintaining the good spin properties of the ball.

The core has a center hardness on the JIS-C hardness scale which, although not particularly limited, is preferably at least 40, more preferably at least 45, and even more preferably at least 50. The upper limit is preferably not more than 75, more preferably not more than 70, and even more preferably not more than 65. At a core center hardness outside of this range, the feel at impact may be poor, the durability may decline and it may not be possible to obtain a spin rate-lowering effect.

The core has a surface hardness on the JIS-C hardness scale which, although not particularly limited, is preferably at least 65, more preferably at least 70, and even more preferably at least 72. The upper limit is preferably not more than 95, more preferably not more than 90, and even more preferably not more than 88. When the surface hardness of the core is lower than this range, the ball rebound may be low, as a result of which a sufficient distance may not be achieved. On the other hand, when the surface hardness of the core is higher than the above range, the feel at impact may be too hard and the durability to cracking on repeated impact may worsen.

In the core hardness profile, the hardness difference between the core surface and the core center is sufficiently large. Specifically, the difference in hardness on the JIS-C scale between the surface A and center B of the core is preferably at least 20, more preferably at least 25, and even more preferably at least 30. The upper limit is preferably not more than 50, more preferably not more than 45, and even more preferably not more than 40. When this hardness difference value is too small, the spin rate-lowering effect on shots with a W #1 may be inadequate and a good distance may not be achieved. On the other hand, when this hardness difference value is too large, the initial velocity of the ball when struck may become lower, resulting is a shorter distance, or the durability to cracking on repeated impact may worsen. Here, "center hardness" refers to the hardness measured at the center of a cross-section obtained by cutting the core into half through the center, and "surface hardness" refers to the hardness measured at the spherical surface of the core. "JIS-C hardness" refers to the hardness measured with the spring-type durometer (JIS-C model) specified in JIS K 6301-1975.

The hardness profile used in this invention is preferably one in which the hardness remains the same or increases, but does not decrease, from the center toward the surface of the core.

It is recommended that the core (hot-molded rubber composition) incur an amount of deflection (deformation) when compressed under a final load of 1,275 N (130 kgf) from an initial load of 98 N (10 kgf) which, although not particularly limited, is preferably at least 2.0 mm, more preferably at least 2.3 mm, and even more preferably at least 2.5 mm, and is preferably not more than 6.0 mm, more preferably not more than 5.5 mm, and even more preferably not more than 5.0 mm. When this value is too large, the core is too soft, as a result of which a sufficient spin rate-lowering effect may not be obtained and the resilience may decrease. When this value is too small, a spin rate-lowering effect may not be obtained and the feel of the ball at impact may become hard.

The core diameter, which is not particularly limited and depends also on the layer construction of the golf ball to be produced, is preferably at least 30 mm, and more preferably at least 35 mm, but is preferably not more than 41 mm, and more preferably not more than 40 mm. At a core diameter outside of this range, the initial velocity of the ball may become low or suitable spin properties may not be obtained.

As described above, the foregoing rubber composition is preferably used as a golf ball core. Also, the golf ball of the invention preferably has a structure that includes a core and a cover of one or more layers.

Next, the cover of one or more layers encasing the core is described.

The cover material is not particularly limited, although a known material such as various ionomer resins and urethane elastomers that are used in golf balls may be employed.

To realize an even further spin rate-lowering effect in the ball, it is especially preferable to use a highly neutralized ionomer material in the layer adjoining the core. Specifically, it is preferable to use a material obtained by blending components (i) to (iv) below: 100 parts by weight of a resin component composed of, in admixture, (i) a base resin of (i-1) an olefin-unsaturated carboxylic acid random copolymer and/or a metal ion neutralization product of an olefin-unsaturated carboxylic acid random copolymer mixed with (i-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (ii) a non-ionomeric thermoplastic elastomer in a weight ratio between 100:0 and 50:50;

(iii) from 5 to 80 parts by weight of a fatty acid and/or fatty acid derivative having a molecular weight of from 228 to 1,500; and (iv) from 0.1 to 17 parts by weight of a basic inorganic metal compound capable of neutralizing un-neutralized acid groups in components (i) and (iii).

In particular, when using a mixed material of components (i) to (iv), it is preferable to utilize one in which at least 70% of the acid groups are neutralized.

The material making up the outermost layer of the cover is preferably one composed primarily of a urethane material, especially a thermoplastic urethane elastomer.

One or more cover layers (intermediate layers) may be formed between the layer adjoining the core and the outermost cover layer. In this case, it is preferable to use a thermoplastic resin such as an ionomer as the intermediate layer material.

To obtain the cover in this invention, use may be made of, for example, a method that involves placing within a mold a single-layer core or a multilayer core of two or more layers that has been prefabricated according to the type of ball, mixing and melting the above mixture under applied heat, and injection-molding the molten mixture over the core so as to encase the core with the desired cover. The cover producing operations in this case can be carried out in a state where excellent thermal stability, flowability and processability are assured. As a result, the golf ball ultimately obtained has a high rebound, and moreover has a good feel at impact and excellent scuff resistance. Alternatively, use may be made of a cover-forming method other than the foregoing, such as one in which, for example, a pair of hemispherical half-cups are molded beforehand from the cover material described above, following which the core is enclosed within the half-cups and molding is carried out under applied pressure at between 120° C. and 170° C. for a period of 1 to 5 minutes.

When the cover has only one layer, the thickness of that layer may be set to from 0.3 to 3 mm. When the cover has two layers, the thickness of the outer cover layer may be set to from 0.3 to 2.0 mm and the thickness of the inner cover layer may be set to from 0.3 to 2.0 mm. The Shore D hardnesses of the respective layers making up the cover (cover layers), although not particularly limited, are set to preferably at least 40, and more preferably at least 45. The upper limit is preferably not more than 70, and more preferably not more than 65.

Numerous dimples are formed on the surface of the outermost layer of the cover. In addition, the cover may be subjected to various types of treatment, such as surface preparation, stamping and painting. In cases where such surface treatment is imparted to the cover formed of the above cover material, the good moldability of the cover surface enables the work to be carried out efficiently.

The invention provides a golf ball in which the above rubber composition is used as the core material for at least one core layer. With regard to the type of golf ball, this rubber composition may be used without particular limitation in golf balls having a core and one or more cover layer, including solid golf balls such as two-piece or three-piece solid golf balls in which the solid core is encased by the cover and multi-piece golf balls having at least a three-piece construction, and also wound golf balls in which a wound core is encased by a single-layer cover or a cover with a multilayer construction of two or more layers.

EXAMPLES

Examples of the invention and Comparative Examples are given below by way of illustration, although the invention is not limited by the following Examples.

Examples 1 to 9, Comparative Examples 1 to 3

Cores having a diameter of 38.6 mm were produced by using the core materials composed primarily of polybutadiene shown in Table 1 below to prepare core compositions formulated for Working Examples 1 to 9 and Comparative Examples 1 to 3, subsequently vulcanizing the compositions at 155° C. for 20 minutes, and then abrading the core surface.

Tripropylene glycol (a lower dihydric alcohol): molecular weight, 192 (from Tokyo Chemical Industry Co., Ltd.)
1-Butanol (a lower monohydric alcohol): molecular weight, 74.1 (from Tokyo Chemical Industry Co., Ltd.)
Stearyl alcohol (a higher monohydric alcohol): molecular weight, 270.1 (available under the trade name "NAA-45" from NOF Corporation
Polyethylene glycol (a higher dihydric alcohol): average molecular weight, 400 (available under the trade name "Polyethylene Glycol #400" from NOF Corporation
Organic Peroxide (Dicumyl peroxide): available under the trade name "Percumyl D" from NOF Corporation
Cross-Sectional Hardnesses of Core
The cross-sectional hardnesses at various positions, including the surface and center, of the 38.6 mm diameter core in each of the above Working Examples and Comparative Examples were measured by the following methods.
(1) Surface Hardness of Core
At a temperature of 23±1° C., the indenter of a durometer was perpendicularly set against a surface portion of the spherical core and the JIS-C hardness was measured at four random points on the core surface. The average value of these measurements was treated as the measured value for

TABLE 1

| Rubber formulation | Working Example | | | | | | | | | Comparative Example | | |
|---|---|---|---|---|---|---|---|---|---|---|---|---|
| (pbw) | 1 | 2 | 3 | 4 | 5 | 6 | 7 | 8 | 9 | 1 | 2 | 3 |
| Polybutadiene rubber | 100 | 100 | 100 | 100 | 100 | 100 | 100 | 100 | 100 | 100 | 100 | 100 |
| Zinc oxide | 17.7 | 9.8 | 17.7 | 17.7 | 17.7 | 17.7 | 17.7 | 17.7 | 18.4 | 19.6 | 20.9 | 20.9 |
| Antioxidant | 0.1 | 0.1 | 0.1 | 0.1 | 0.1 | 0.1 | 0.1 | 0.1 | 0.1 | 0.1 | 0.1 | 0.1 |
| Zinc acrylate | 34 | 54 | 34 | 34 | 34 | 34 | 34 | 34 | 33 | 29 | 32 | 32 |
| Zinc salt of pentachlorothiophenol | 0.5 | 0.5 | 0.5 | 0.5 | 0.5 | 0.5 | 0.5 | 0.5 | — | 0.5 | 0.5 | 0.5 |
| Propylene glycol | 1 | 5 | | | | | | | | 1 | | |
| Glycerol | | | 1 | | | | | | | | | |
| Ethylene glycol | | | | 1 | | | | | | | | |
| Diethylene glycol | | | | | 1 | | | | | | | |
| Dipropylene glycol | | | | | | 1 | | | | | | |
| Tripropylene glycol | | | | | | | 1 | | | | | |
| 1-Butanol | | | | | | | | 1 | | | | |
| Stearyl alcohol | | | | | | | | | | | 5 | |
| Polyethylene glycol | | | | | | | | | | | | 5 |
| Organic peroxide | 1 | 1 | 1 | 1 | 1 | 1 | 1 | 1 | 1 | 1 | 1 | 1 |

Details on the above formulations are given below.
Polybutadiene: Available under the trade name "BR 01" from JSR Corporation
Zinc oxide: Available as "Zinc Oxide Grade 3" from Sakai Chemical Co., Ltd.
Antioxidant: A phenolic antioxidant available under the trade name "Nocrac NS-6" from Ouchi Shinko Chemical Industry Co., Ltd.
Zinc acrylate: Available under the trade name "ZN-DA85S" (85% zinc acrylate/15% zinc stearate) from Nippon Shokubai Co., Ltd.
Zinc salt of pentachlorothiophenol: Available from Wako Pure Chemical Industries, Ltd.
Propylene glycol (a lower dihydric alcohol): molecular weight, 76.1 (from Hayashi Pure Chemical Ind., Inc.)
Glycerol (a lower trihydric alcohol): molecular weight, 92.1 (from Hayashi Pure Chemical Ind., Inc.)
Ethylene glycol (a lower dihydric alcohol): molecular weight, 62.1 (from Hayashi Pure Chemical Ind., Inc.)
Diethylene glycol (a lower dihydric alcohol): molecular weight, 106 (from Hayashi Pure Chemical Ind., Inc.)
Dipropylene glycol (a lower dihydric alcohol): molecular weight, 134 (from Tokyo Chemical Industry Co., Ltd.)

one core, and the average value for three measured cores was determined. These results are presented in Table 3.
(2) Cross-Sectional Hardnesses of Core
The core was cut through the center to obtain a flat cross-sectional plane. At a temperature of 23±1° C., the indenter of a durometer was perpendicularly set against the cross-sectional plane and the JIS-C hardness was measured at the center of the hemispherical core and at 2 mm intervals from the center toward the surface, thereby collecting the measurements for one core. The average values for three measured cores were determined. These results are presented in Table 3.
Core and Ball Deflection
The amount of deflection (mm) by each core and ball when compressed at a speed of 10 mm/s under a final load of 1,275 N (130 kgf) from an initial load of 98 N (10 kgf) was measured at a temperature of 23±1° C. In each case, the average value for 10 measured cores or balls was determined.
Formation of Cover (Intermediate Layer and Outermost Layer)
Using an injection mold, the intermediate layer material (ionomer resin material) shown in Table 2 was then injection-molded over the surface of the above core, thereby forming an intermediate layer having a thickness of 1.3 mm and a Shore D hardness of 64. Next, using a different injection mold, the outermost layer material (urethane resin material) shown in Table 2 was injection-molded over the intermediate layer-encased sphere, thereby forming an outermost layer having a thickness of 0.8 mm and a Shore D hardness of 40.

TABLE 2

| Formulation (pbw) | Intermediate layer | Outermost layer |
|---|---|---|
| Himilan 1706 | 35 | |
| Himilan 1557 | 15 | |
| Himilan 1605 | 50 | |

TABLE 2-continued

| Formulation (pbw) | Intermediate layer | Outermost layer |
|---|---|---|
| TPU | | 100 |
| Polyethylene wax | | 1.0 |
| Isocyanate compound | | 6.3 |
| Titanium oxide | | 3.3 |
| Trimethylolpropane | 1.1 | |

Details on the compounding ingredients in the table are given below.

Himilan 1706, Himilan 1557, Himilan 1605: Ionomer resins available from DuPont-Mitsui Polychemicals Co., Ltd.

TPU: An ether type-thermoplastic polyurethane available under the trade name "Pandex" from DIC Covestro Polymer, Ltd.; Shore D hardness, 40

Polyethylene wax: Available under the trade name "Sanwax 161P" from Sanyo Chemical Industries, Ltd.

Isocyanate compound: 4,4'-Diphenylmethane diisocyanate

The spin rates of the resulting golf balls on shots with a driver were evaluated by the following method. The results are shown in Table 3.

Spin Rate on Shots with a Driver

A driver (W #1) was mounted on a golf swing robot and the spin rate of the ball immediately after being struck at a head speed of 45 m/s was measured using an apparatus for measuring the initial conditions. The club used was the TourB XD-3 Driver (2016 model; loft angle, 9.5°) manufactured by Bridgestone Sports Co., Ltd.

TABLE 3

| | | | Working Example | | | | | |
|---|---|---|---|---|---|---|---|---|
| | | | 1 | 2 | 3 | 4 | 5 | 6 |
| Core | Deflection (mm) | | 3.31 | 3.42 | 3.20 | 3.25 | 3.34 | 3.28 |
| | Hardness profile (JIS-C) | Center hardness (B) | 60.9 | 54.8 | 60.6 | 60.7 | 61.2 | 61.6 |
| | | Hardness 2 mm from center | 62.0 | 55.8 | 61.9 | 61.8 | 61.6 | 63.8 |
| | | Hardness 4 mm from center | 62.9 | 57.5 | 62.6 | 62.4 | 62.0 | 64.5 |
| | | Hardness 6 mm from center | 64.7 | 60.2 | 64.5 | 64.4 | 63.9 | 66.1 |
| | | Hardness 8 mm from center | 66.1 | 64.0 | 66.0 | 65.9 | 65.7 | 66.4 |
| | | Hardness 10 mm from center | 67.1 | 68.3 | 66.7 | 66.4 | 66.2 | 67.9 |
| | | Hardness 12 mm from center | 72.8 | 75.3 | 72.6 | 72.6 | 72.4 | 71.3 |
| | | Hardness 14 mm from center | 77.9 | 79.2 | 78.5 | 77.2 | 76.6 | 77.8 |
| | | Hardness 16 mm from center | 82.9 | 82.2 | 82.4 | 82.0 | 81.3 | 82.8 |
| | | Hardness 18 mm from center | 83.1 | 83.4 | 82.5 | 82.0 | 82.4 | 83.8 |
| | | Surface hardness (A) | 87.0 | 85.8 | 86.5 | 85.4 | 85.3 | 88.2 |
| | | Hardness difference (A − B) | 26.1 | 31.0 | 25.9 | 24.7 | 24.1 | 26.6 |
| Ball | Deflection (mm) | | 2.62 | 2.51 | 2.52 | 2.57 | 2.65 | 2.58 |
| | Spin rate on driver shots (rpm) | | 2,541 | 2,645 | 2,604 | 2,575 | 2,497 | 2,746 |

| | | | Working Example | | | Comparative Example | | |
|---|---|---|---|---|---|---|---|---|
| | | | 7 | 8 | 9 | 1 | 2 | 3 |
| Core | Deflection (mm) | | 3.39 | 3.48 | 3.44 | 3.35 | 3.28 | 3.19 |
| | Hardness profile (JIS-C) | Center hardness (B) | 61.0 | 60.0 | 59.4 | 65.0 | 64.8 | 65.1 |
| | | Hardness 2 mm from center | 63.1 | 60.4 | 60.7 | 65.3 | 65.1 | 65.4 |
| | | Hardness 4 mm from center | 64.3 | 60.3 | 61.4 | 65.6 | 65.2 | 65.7 |
| | | Hardness 6 mm from center | 66.4 | 61.8 | 63.6 | 66.4 | 65.9 | 66.7 |
| | | Hardness 8 mm from center | 66.7 | 64.4 | 64.4 | 68.7 | 68.2 | 68.9 |
| | | Hardness 10 mm from center | 67.2 | 67.0 | 65.3 | 69.9 | 69.4 | 70.8 |
| | | Hardness 12 mm from center | 70.9 | 72.2 | 71.1 | 72.7 | 72.1 | 73.2 |
| | | Hardness 14 mm from center | 77.2 | 75.7 | 76.5 | 77.1 | 76.5 | 77.8 |
| | | Hardness 16 mm from center | 82.1 | 80.2 | 81.6 | 79.9 | 79.3 | 80.1 |
| | | Hardness 18 mm from center | 81.7 | 80.7 | 82.1 | 79.3 | 78.5 | 79.6 |
| | | Surface hardness (A) | 88.0 | 85.4 | 87.1 | 81.9 | 81.1 | 82.3 |
| | | Hardness difference (A − B) | 27.0 | 25.4 | 27.7 | 16.9 | 16.3 | 17.2 |
| Ball | Deflection (mm) | | 2.66 | 2.77 | 2.61 | 2.77 | 2.71 | 2.64 |
| | Spin rate on driver shots (rpm) | | 2,709 | 2,433 | 2,627 | 2,878 | 2,844 | 2,908 |

As shown in Table 3, in each of Working Examples 1 to 9 in which a rubber composition containing a lower alcohol having a molecular weight of less than 200 was used as the core material, unlike in Comparative Examples 1 to 3, the hardness difference between the center and surface of the core was more than 20 on the JIS-C hardness scale, and so a sufficient hardness difference was obtained. As a result, the spin rate of the golf ball on shots with a driver was about 100 to 500 rpm lower than in the Comparative Examples in which the hardness difference was less than 20 and thus inadequate.

Japanese Patent Application No. 2018-111044 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rubber composition for golf balls, comprising:
   (a) a base rubber,
   (b) a co-crosslinking agent which is an α,β-unsaturated carboxylic acid or a metal salt thereof or both,
   (c) a crosslinking initiator, and
   (d) a lower alcohol having a molecular weight of less than 150,
   wherein the amount of component (d) is from 0.1 to 10 parts by weight per 100 parts by weight of the base rubber (a).

2. The rubber composition of claim 1, wherein the amount of component (d) is from 0.5 to 5 parts by weight per 100 parts by weight of the base rubber (a).

3. The rubber composition of claim 1, wherein component (d) is a monohydric, dihydric or trihydric alcohol.

4. The rubber composition of claim 3, wherein component (d) is butanol, glycerol, ethylene glycol or propylene glycol.

5. The rubber composition of claim 1, further comprising (e) an organosulfur compound.

6. The rubber composition of claim 1, wherein the vulcanized form of the rubber composition is a golf ball core.

7. The rubber composition of claim 6, wherein the vulcanized rubber composition has a surface and a center with a hardness difference therebetween of at least 20 on the JIS-C hardness scale.

8. A golf ball comprising a core and a cover of one or more layers encasing the core, wherein the core is formed of the rubber composition of claim 1.

9. The golf ball of claim 8, wherein the core has a hardness profile in which a surface and a center of the core have a hardness difference therebetween of at least 20 on the DIS-C hardness scale.

10. The golf ball of claim 8, wherein the core has a center hardness of from 50 to 65 on the JIS-C hardness scale.

11. The golf ball of claim 8, wherein the core has a surface hardness of from 72 to 95 on the JIS-C hardness scale.

12. The golf ball of claim 8, wherein the core has an amount of deflection of from 2.0 to 5.0 mm when compressed under a final load of 1,275 N (130 kgf) from an initial load of 98 N (10 kgf).

* * * * *